(12) United States Patent
Helmi (10) Patent No.: US 9,006,961 B2
(45) Date of Patent: Apr. 14, 2015

(54) ENDSHIELD

(75) Inventor: Hussam Helmi, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 13/521,131

(22) PCT Filed: Nov. 23, 2010

(86) PCT No.: PCT/EP2010/067965
§ 371 (c)(1),
(2), (4) Date: Oct. 1, 2012

(87) PCT Pub. No.: WO2011/082879
PCT Pub. Date: Jul. 14, 2011

(65) Prior Publication Data
US 2013/0015737 A1      Jan. 17, 2013

(30) Foreign Application Priority Data
Jan. 7, 2010   (DE) ................. 10 2010 000 710

(51) Int. Cl.
| | |
|---|---|
| *H02K 11/00* | (2006.01) |
| *H02K 5/173* | (2006.01) |
| *H02K 3/50* | (2006.01) |
| *H02K 3/52* | (2006.01) |
| *H02K 5/22* | (2006.01) |

(52) U.S. Cl.
CPC ............... *H02K 5/1732* (2013.01); *H02K 3/50* (2013.01); *H02K 3/521* (2013.01); *H02K 5/225* (2013.01); *H02K 2203/03* (2013.01)

(58) Field of Classification Search
USPC .......................... 310/71, 90, 400, 401, 416
See application file for complete search history.

(56) References Cited

U.S. PATENT DOCUMENTS

| | | | |
|---|---|---|---|
| 5,610,462 A * | 3/1997 | Takahashi ...................... 310/90 |
| 6,648,613 B2 * | 11/2003 | Clausson et al. ........... 417/423.1 |
| 6,713,914 B2 * | 3/2004 | Yoshida et al. ................. 310/89 |
| 8,368,262 B2 * | 2/2013 | Ishizue et al. .................. 310/43 |
| 2002/0141672 A1 | 10/2002 | Lau |
| 2004/0007935 A1 | 1/2004 | Kimura et al. |
| 2004/0036369 A1 | 2/2004 | Kanazawa et al. |

FOREIGN PATENT DOCUMENTS

| | | |
|---|---|---|
| CN | 1408138 | 4/2003 |
| DE | 20119108 | 2/2002 |
| DE | 10234111 | 2/2004 |
| EP | 1024581 | 8/2000 |
| JP | H01116219 | 5/1989 |
| JP | 6-44370 | 6/1994 |

(Continued)

OTHER PUBLICATIONS

PCT/EP2010/067965 International Search Report dated Jan. 13, 2012 (English Translation and Original, 6 pages).

*Primary Examiner* — Dang Le
(74) *Attorney, Agent, or Firm* — Michael Best & Friedrich LLP (57) ABSTRACT

The invention relates to a bearing shield (5) for an electrical motor having a rotor and a stator, wherein the bearing shield (5) has a receptacle (25) for a bearing (400) for bearing a shaft of the rotor (100) and wherein the bearing shield is arranged in a housing (35) of an electrical motor, wherein the bearing shield has a current carrier (13, 23, 24, 60) which is configured to connect at least one coil (74) of the stator to a power connection or to another coil (74) of the stator.

17 Claims, 11 Drawing Sheets

(56) References Cited

FOREIGN PATENT DOCUMENTS

| JP | H09257046 | 9/1997 |
| JP | H09322506 | 12/1997 |
| JP | 2007020282 | 1/2007 |
| WO | 2005101616 | 10/2005 |

* cited by examiner

ENDSHIELD

BACKGROUND OF THE INVENTION

The invention relates to an endshield for an electric motor with a rotor and a stator, the endshield having a receptacle for a bearing for the bearing arrangement of a shaft of the rotor, and the endshield being arranged in a housing of the electric motor.

A large number of endshields in electric motors are known. DE 201 19 108 U1 has disclosed an electric motor with an endshield which has a bearing face for at least one component, in particular a coil. The coils are connected to a connection plug by means of cables. In this case, the cables are passed through the endshield into the interior of a housing of the electric motor by means of a cable bushing. The endshield also has a bearing face with a disk, the bearing face and the disk serving to fasten further component parts, whereby the ventilation of the electric motor should not be restricted.

In addition, EP 1 024 581 B1 has disclosed an electric motor and a method for making contact between windings of an electric motor, the windings being wound in such a way that the wire ends of the windings leave the windings at a rear end side. In addition, a contact carrier is arranged at the end side of the windings, with the wire ends of the windings being guided to said contact carrier and are grasped by a gripper of the contact carrier which is equipped with a receiving device in the form of a comb or a fork as thread-in aid in order to receive the wire ends. In this case, at least two of the wire ends are brought together by the gripper on an end side of the contact carrier. In addition, the ends of the windings on the end side of the contact carrier are conductively connected to one another by means of an insulation displacement contact. In this case, the windings are part of the stator. In addition, the rotor is mounted via a bearing which is arranged in the housing and via a bearing which is arranged in an endshield.

SUMMARY OF THE INVENTION

The object of the present invention consists in providing an endshield for an electric motor which has a simple design and makes optimum use of the installation space for an electric motor.

In accordance with the invention, it has been identified that the endshield can have a particularly simple design and provides an interior of the electric motor which is optimized in terms of installation space by virtue of the endshield having a power supply line, which connects at least one winding of the stator to an electrical connection and/or to a further winding of the stator.

This has the advantage that the function of the endshield, namely the bearing arrangement of the shaft of the rotor, and the function of a contact plate, namely interconnecting the individual windings of the stator of the electric motor, are combined in one assembly, with the result that optimum use is made of the installation space in the interior of an electric motor and the fitting time during fitting of the electric motor is reduced.

In a further embodiment of the invention, the power supply line has a first contact face and a second contact face, the first contact face being connected to the electrical connection and the second contact face being connected to at least one winding. In this way, the windings can be connected to one another and to the electrical connection in a reliable manner.

In a further embodiment of the invention, at least one of the two contact faces is in the form of an insulation displacement contact. This has the advantage that contact can be made between the feed lines of the windings and/or the line of the electrical connection by means of an insulation displacement contact in a quick and reliable manner.

In a further embodiment of the invention, the endshield is in the form of a plate, the first contact face being arranged on a first side of the endshield and the second contact face being arranged on a second side of the endshield. This has the advantage that the feed lines to the windings do not need to be guided through the endshield and thus the endshield can be fitted in the electric motor in a quick and reliable manner, with contact being made between the windings likewise in this process.

In a further embodiment of the invention, a connection to the electrical connection at the first contact face and/or the connection to the winding at the second contact face is performed by means of a welding process, a soldering process or by means of a crimping process. In this way, a connection of the components of the electric motor can be performed in a quick and reliable manner in the manufacturing process through the endshield.

In a further embodiment of the invention, the power supply line is in the form of a rail and/or is fastened to the endshield by means of at least one holding element. In this way, the power supply line can be fastened to the endshield in a reliable manner.

In a further embodiment of the invention, the endshield has at least one latching cam at the receptacle of the bearing, said latching cam being designed to fasten the bearing and/or a spring washer to the endshield. In this way, the bearing and/or a spring washer can be fixed in the receptacle in a quick and reliable manner.

In a further embodiment of the invention, the latching cam has, on the rear side with respect to a latching tab, a receptacle, which receives a spring ring. In this way, an additional holding force can be applied to the latching cam by means of the spring ring in order to fix the bearing and/or the spring washer. This has the advantage that the bearing and/or the spring washer are fixed in the receptacle in a particularly robust manner.

In a further embodiment of the invention, the endshield has, circumferentially, at least one latching element, which is designed to fix the endshield in the housing of the electric motor. In this way, the endshield can be fixed in the housing of the electric motor in a simple manner during the production process.

BRIEF DESCRIPTION OF THE DRAWINGS

The invention will be explained in more detail below with reference to the figures, in which.

DETAILED DESCRIPTION

Figure 1:
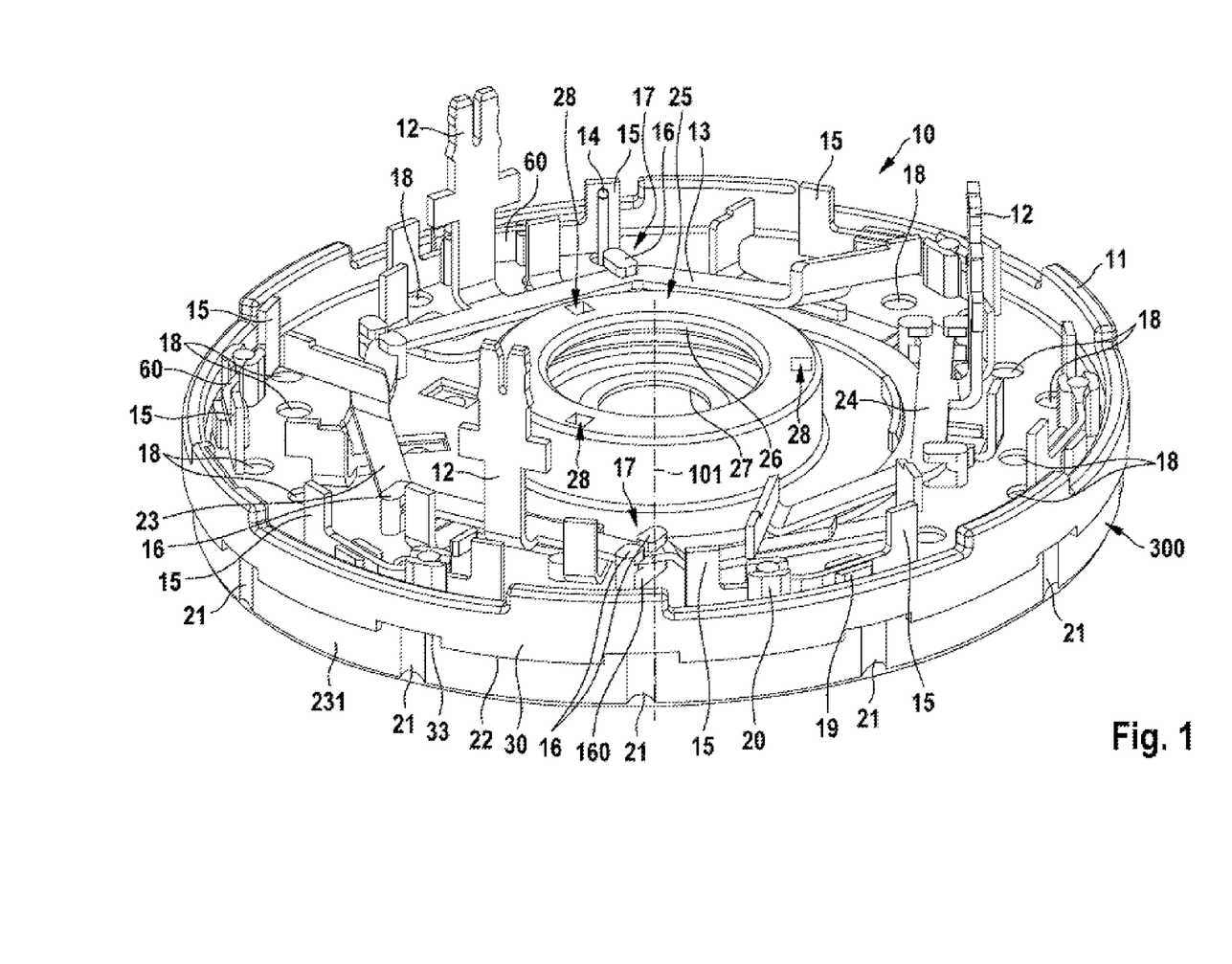
FIG. 1 shows a perspective view of a first endshield.

FIG. 1 shows a perspective view of a first endshield 10 of a brushless electric motor. The electric motor comprises a rotor and a stator, which are arranged in a housing. The rotor is mounted by means of a first bearing arranged in the housing and by means of a bearing arranged in the first endshield 10. A plurality of windings inducing an alternating magnetic field are arranged in the stator.

The first endshield 10 comprises a mount 11, which is in the form of a disk. The mount 11 has, centrally, a bearing receptacle 25, which is arranged on the mount 11. In addition, the mount 11 comprises, circumferentially, a peripheral first web 300. A plurality of power supply lines 13, 23, 24, 60 is arranged on the mount 11. The power supply lines 13, 23, 24, 60 are in this case arranged in different planes partially one above the other on the mount 11. In this case, through-openings 18 are arranged in the mount 11 in the region of the power supply lines 13, 23, 24, 60. The power supply lines 13, 23, 24, 60 are in the form of rails and can be produced in a stamping and bending process, for example.

The fastening of the power supply lines 13, 23, 24, 60 is performed by means of the holding elements 17, 19, 20, with first holding elements 17 having a spacer 160 and a holding tab 16. The spacer 160 spaces apart the conductor rails 13, 23, 24, 60 from a surface of the mount. The spacer 160 therefore also fixes the fastening plane of the spacer 13, 23, 24, 60. In order to fasten the power supply lines 13, 23, 24, 60 to the mount 11 in a reliable manner, the holding tabs 16 on the first holding element 17 surround the individual power supply lines 13, 24, 23, 60 and thus fix the position of the power supply line 13, 23, 24, 60. The holding tabs 16 can in this case be bent back through approximately 90° out of a vertical position in a hot-stamping method once the power supply lines 13, 23, 24, 60 have been inserted, with the result that the holding tabs 16 prevent the power supply lines 13, 23, 24, 60 from moving after cooling. The individual power supply lines 13, 23, 24, 60 can be arranged on different planes owing to the different lengths of the spacer 160, with the result that the individual conductor rails 13, 23, 24, 60 do not need to be insulated from one another, for example by means of an insulated surface. The distances between the individual planes of the conductor rails 13, 23, 24, 60 are selected such that the conductor rails 13, 23, 24, 60 do not come into touching contact with one another.

The power supply lines 13, 23, 24 each have a first contact point 12, which is in the form of an insulation displacement contact connection. This has the advantage that the first contact point 12 can be connected permanently to a line of the electrical connection in a quick and reliable manner during fitting of the endshield 10.

The power supply lines 13, 23, 24, 60 also have differently arranged second contact points 15, the second contact points 15, in the same way as the first contact points 12, being aligned parallel to a rotor shaft axis 101 of the electric motor. The second contact points 15 are arranged in a region of the through-openings 18. In each case individual lines 14 of the windings are guided by the mount 11 through the through-openings 18. The lines 14 can be fastened to the second contact points 15 by means of a welding, soldering or crimping process. This has the advantage that there is a reliable connection between the lines 14 of the windings and the power supply lines 13, 23, 24, 26. However, it is also conceivable for the lines 14 or the wires of the windings, in the same way as at the first contact points 12, to be fastened to the second contact faces 15 by means of an insulation displacement region.

The individual power supply lines 13, 23, 24, 60 are configured corresponding to their function of distributing the current flow through the windings connected thereto. The windings are energized by means of a three-phase current connection, with the result that the power supply lines 13, 23, 24, 60 therefore have three electrical connections with the first contact points 12. The individual windings are connected to one another by means of the first power supply lines 60, which conduct the current from a first winding to a second winding. The second contact points 15 arranged at the first power supply lines 60 serve to connect the winding.

Circumferentially, a first web 300 is arranged on the mount 11. The first web 300 has a plurality of shoulders 22, 220 and notches 21 in order to fix the mount 11 in a housing of the electric motor. The notches 21 serve the purpose of receiving a pinch rib (not illustrated) arranged on the housing. As the endshield 10 is pushed into the housing of the electric motor, the pinch ribs are plastically deformed by means of the notches being pushed onto the pinch ribs and, by virtue of a form-fitting connection, fix the position of the endshield 10. An axial movement of the endshield 10 is fixed by a first shoulder 22 on the first web 300, which prevents any further movement during fitting of the endshield 10 in the direction of the windings. A rotary movement is also prevented by a plurality of first cutouts 33 arranged on the shoulder 22 by virtue of the first cutouts 33 receiving a protrusion of the housing of the electric motor.

Figure 2:
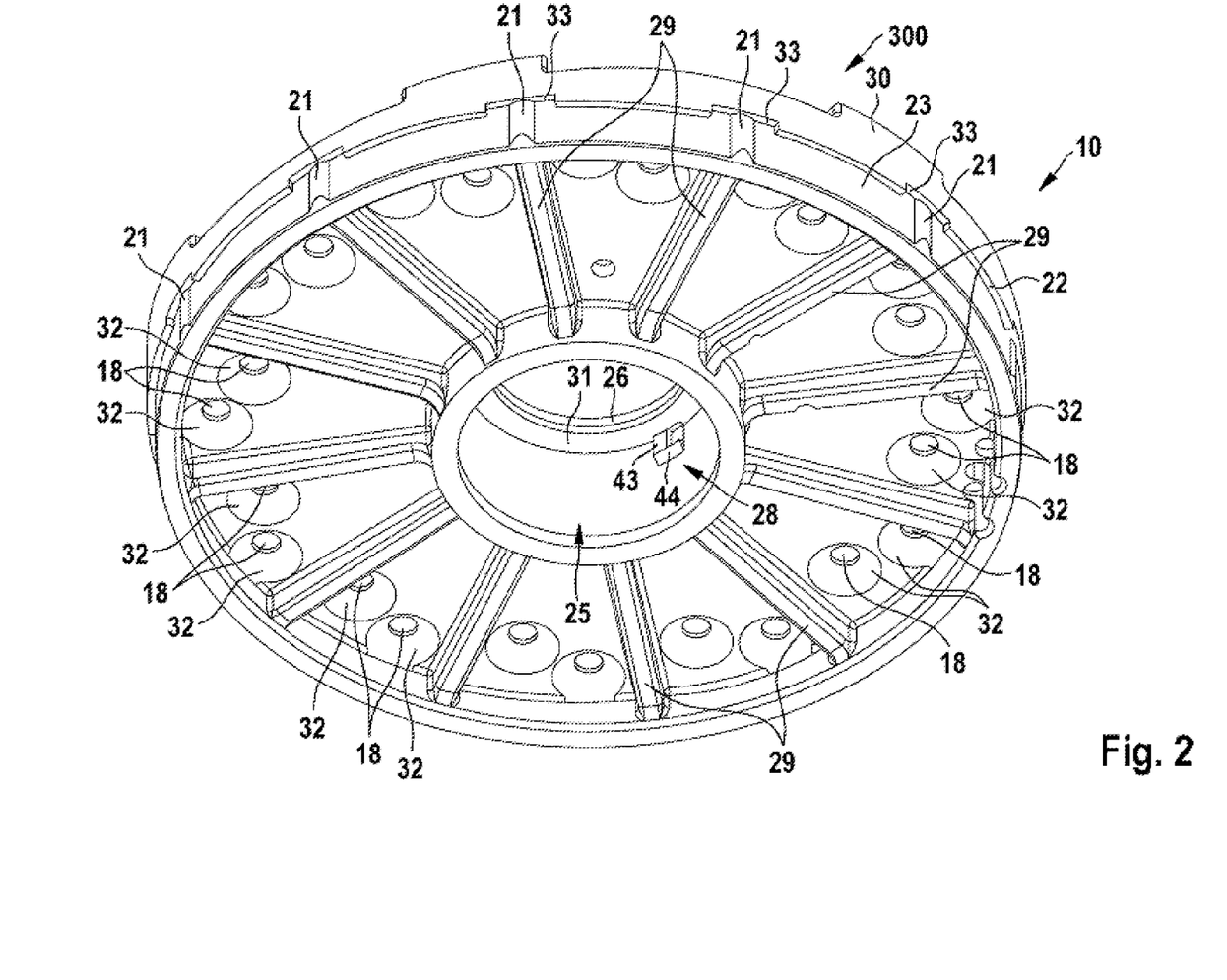
FIG. 2 shows a perspective rear view of the first endshield.

FIG. 2 shows a perspective rear view of the first endshield 10. A bearing receptacle 25 is arranged centrally in the plate-shaped first endshield 10. The endshield 10 has a plurality of second webs 29 in order to support the bearing forces, said second webs connecting the first web 300 to the bearing receptacle 25. In each case through-openings 18 are arranged between the individual segments formed of the individual second webs 29. In order to make it easier for the wires of the windings to be passed through, the through-openings 18 have a chamfered region 32.

The bearing receptacle 25 has, at its inner circumferential surface, a first latching element 28 with a latching tab 44 and a latching spring 43. The first latching element 28 is designed to hold a spring washer. This has the advantage that no additional tool is required during fitting of the endshield 10 in order to secure the spring washer, which is required for the bearing arrangement, so as to prevent it from falling out of the bearing receptacle 25.

Figure 3:
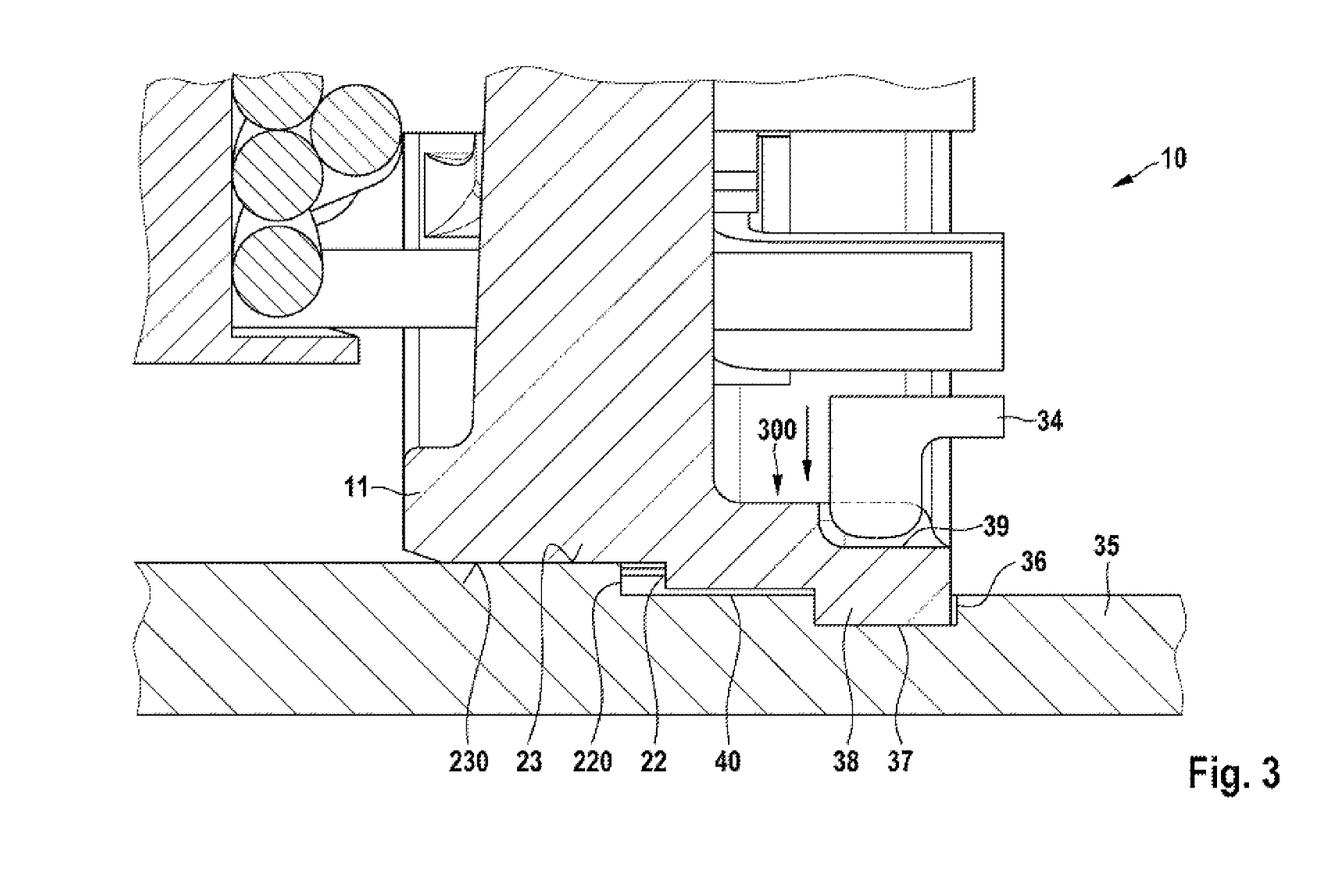
FIG. 3 shows a detail of a section through a housing of an electric motor with the first endshield installed.

FIG. 3 shows a detail of a section through a housing 35 of the electric motor with the first endshield 10. A hot-stamping die 34 is arranged on the first endshield 10 on the inside with respect to the first web 300. The hot-stamping die 34 is designed to be positioned on a stamping face 39 of the first endshield 10 and to heat the stamping face 39. The housing 35 of the electric motor has a second cutout 37. Once the first web 300 has been heated in the region of the stamping face 39, the hot-stamping die 34 pushes the first web 300 circumferentially outwards in the direction of the housing 35 of the electric motor. As a result, the first web 300 is pressed outwards and is matched to the contour of the second cutout 37 in the housing 35.

In addition, the housing 35 has a second shoulder 220, which is associated with the first shoulder 22. The two shoulders 22, 220 serve the purpose of enabling the first endshield 10 to be inserted not too deeply into the housing 39 of the electric motor during fitting in the direction of the windings. A circumferential face 231 of the first endshield 10 serves to support the bearing forces transmitted via the second webs 29 on an inner side 230 of the housing 35.

Figure 4:
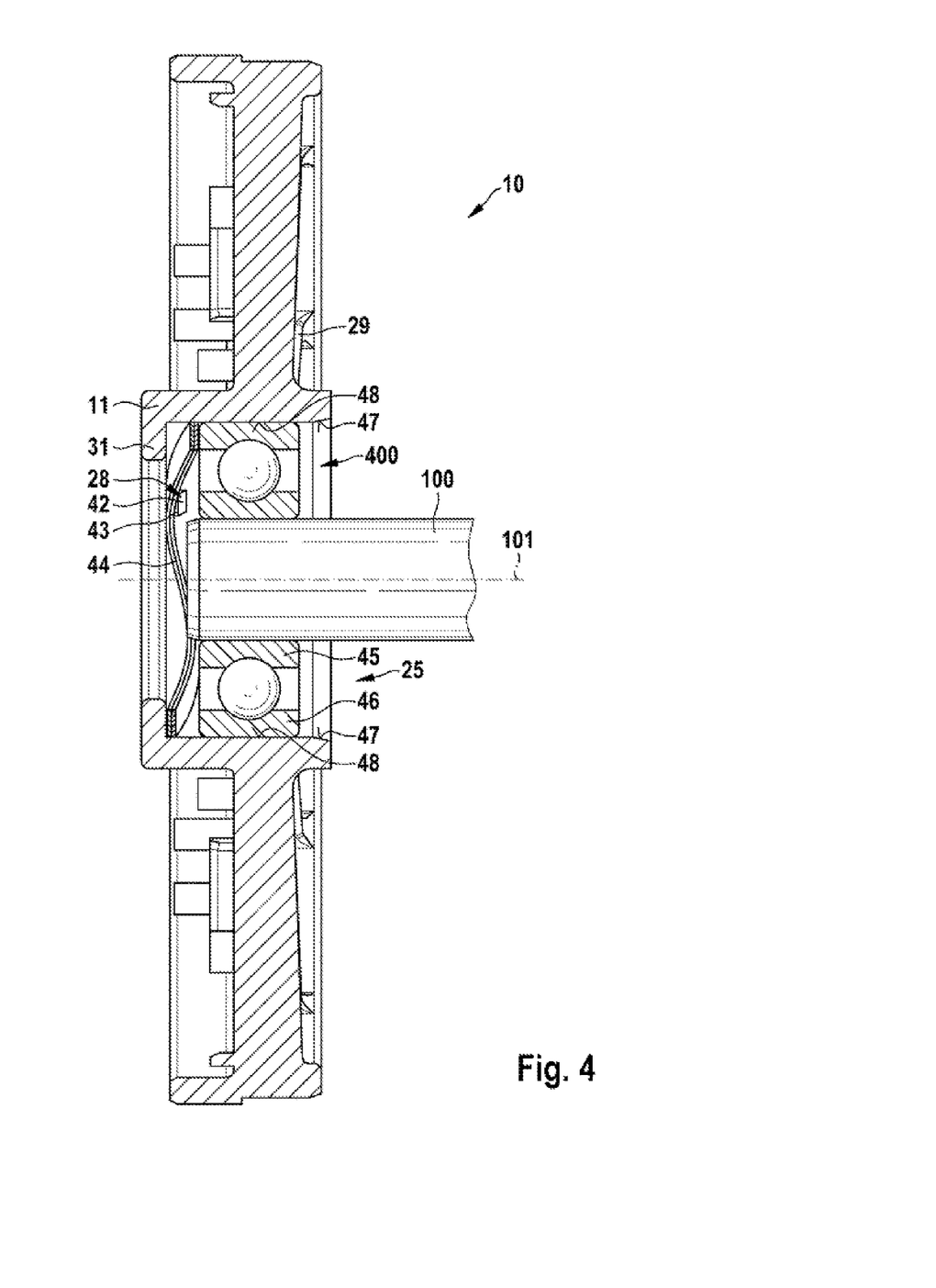
FIG. 4 shows a cross section through the first endshield.

FIG. 4 shows a cross section through the first endshield 10. In addition, a rolling bearing 400 and the spring washer 44 are arranged on the first endshield 10. The rolling bearing 400 supports the rotor shaft 100. The rolling bearing 400 has an inner ring 45, which is associated with the rotor shaft 100, and an outer ring 46, which is associated with the bearing receptacle 25. The bearing receptacle 25 in this case comprises a circumferentially arranged bearing face 48 and the first latching element 28. The spring washer 44 is arranged on the left-hand side with respect to the rolling bearing 400. The spring washer 44 bears both against the outer ring 46 and against a third shoulder 31, which delimits the bearing face 48 in the axial direction.

The rotor shaft 100 is supported by means of the rolling bearing 400. For this purpose, the rotor shaft 100 is pressed into the inner ring 45 of the rolling bearing 400. The outer ring 46 has a sliding fit on the bearing face 48. The bearing face 48 is provided in good time with a chamfer 47 in order to facilitate the insertion of the pressed-on rolling bearing with the rotor shaft into the endshield. The first latching element latches with the latching tab 42 on the spring washer 44 and thus ensures simple fitting of the spring washer 44 in the first endshield 10.

Figure 5:
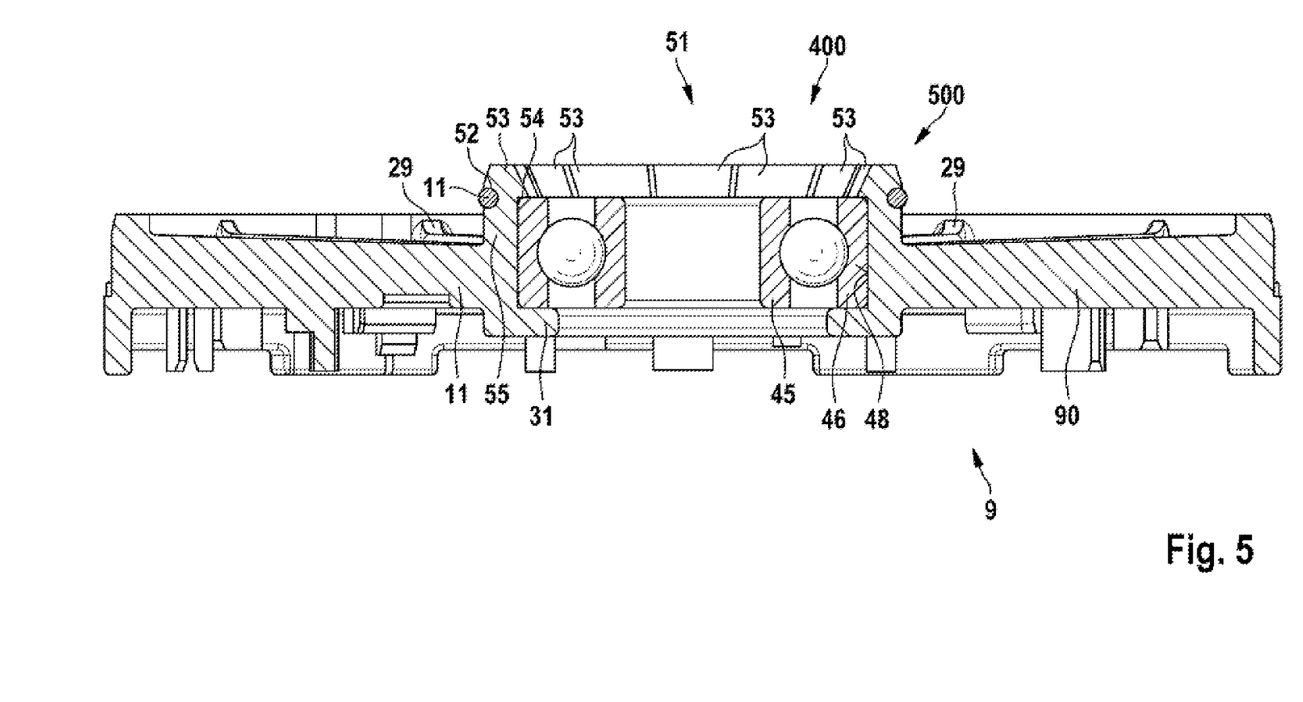
FIG. 5 shows a cross section through a second endshield.

FIG. 5 shows a cross section through a second endshield 9. The second endshield 9 has a similar design to the first endshield 10. However, the receiving region 25 of the bearing differs from the embodiment shown in FIG. 1 to FIG. 4 of the first endshield 10. In order to fasten the rolling bearing 400 in a second mount 90 of the second endshield 9, the second mount 90 has a multiplicity of second latching elements 51 along the bearing face 48. On the opposite side, the bearing face 48 is delimited by the third shoulder 31. The latching elements 51 have a second latching spring 53 and a second latching tab 54. On that side of the latching spring 53 which is remote from the rolling bearing 400, the latching spring 53 has a receptacle 52 for a spring ring 50. The receptacle 52 is formed peripherally around the second latching elements 51. The second latching tab 54 delimits the bearing face 48 and prevents the outer ring 46 of the rolling bearing 400 from being moved out of the bearing face 48.

The second latching elements 51 have the advantage that the rolling bearing 400 can be introduced into the second mount 90 simply and quickly during fitting. If the rolling bearing 400 is pressed in the direction of its bearing position, the latching tabs 54 are pressed by means of the sprung suspension by virtue of the second latching springs 53 out of the movement path of the rolling bearing. If the rolling bearing is located at the stop, the outer ring 46 bears with a side face against the third shoulder 31. A movement in the opposite direction to the fitting direction is prevented by the second latching elements 51, which snap in again after fitting, with the second latching tabs 54.

Figure 6:
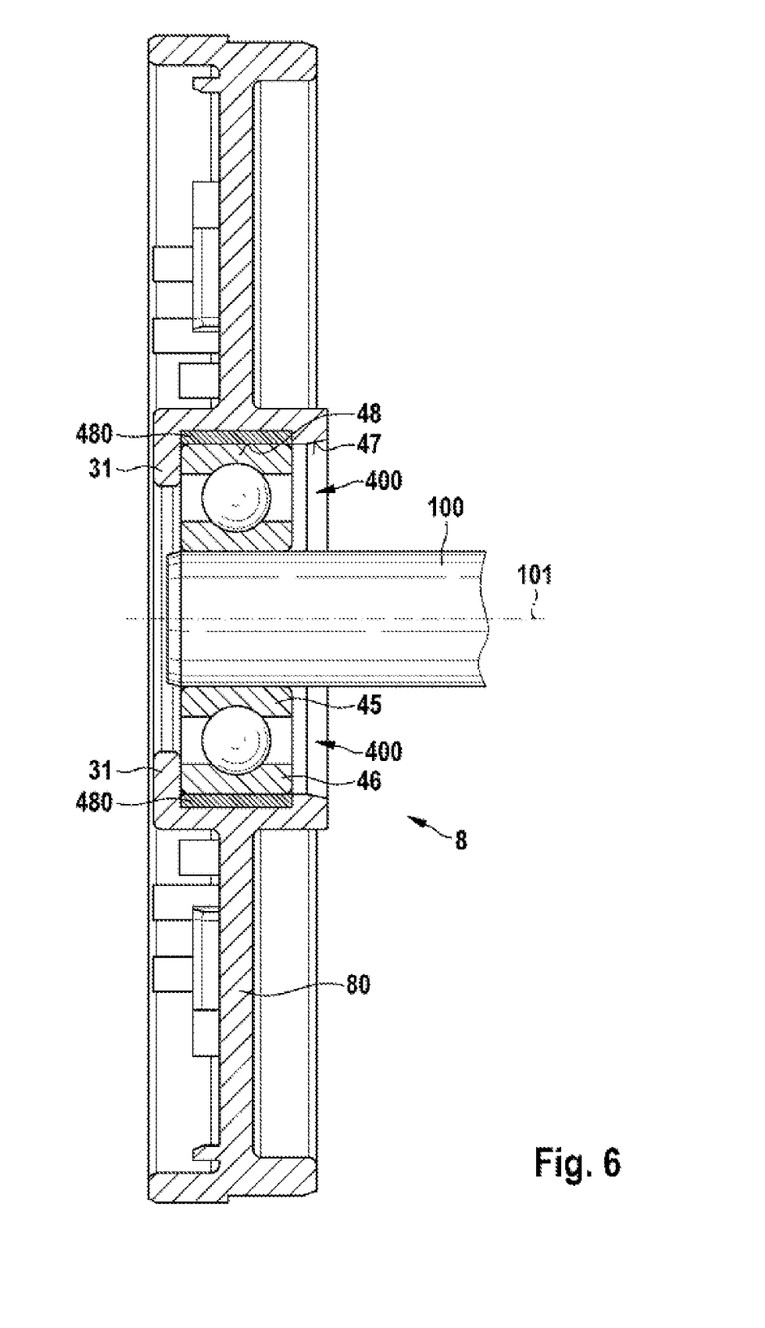
FIG. 6 shows a cross section through a third endshield.

FIG. 6 shows a cross section through a third endshield 8. In contrast to the embodiment shown in FIG. 5, the rolling bearing 400 is fastened on the outer ring 46 of a third mount 80 of the third endshield 8 by means of a press fit. The third endshield 8 has a sleeve 480 in the region of the bearing face 48 of the third mount 80, said sleeve being manufactured from a metal material, for example. The sleeve 480 has been encapsulated by injection molding with the material, for example plastic, of the third mount 80 in the further production process of the third endshield 8. The sleeve 480 serves a purpose of ensuring that the rolling bearing 400 has a reliable press fit on the outer ring 46. The rotor shaft 100 is arranged on the inner ring 45 by means of a sliding fit. However, it is also conceivable for the rolling bearing 400 to be encapsulated by injection molding with material even during the production of the third mount 80. Likewise, a press fit on the outer ring 46 of the rolling bearing without the sleeve 480 shown is possible. In the case of the press fit of the rolling bearing 400, the third shoulder 31 serves a purpose of fixing the axial position during fitting of the rolling bearing 400 in the third endshield 8.

Figure 7:
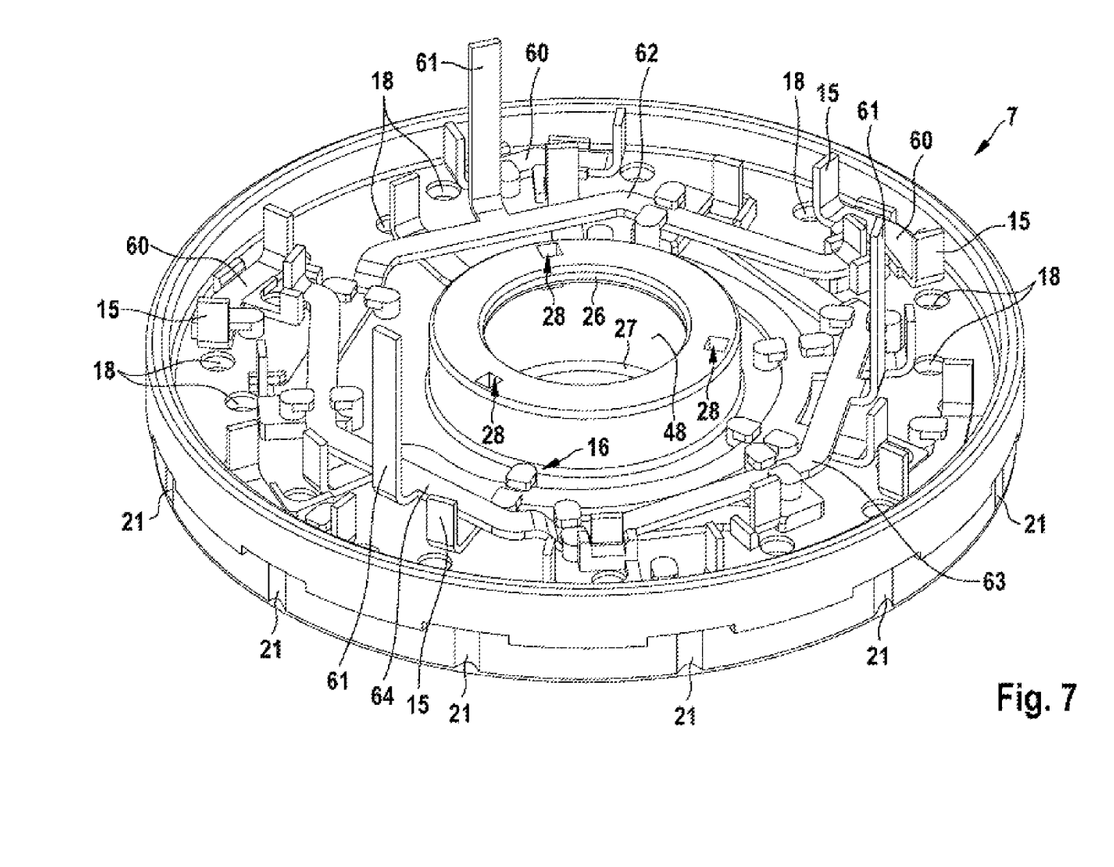
FIG. 7 shows a perspective view of a fourth endshield.

FIG. 7 shows a perspective view of a fourth endshield 7. The fourth endshield 7 has a similar design to the first endshield 10 shown in FIG. 1 to FIG. 4. The fourth endshield 7 has third contact points 61. The third contact points 61, which replace the first contact points 12 shown in FIG. 1, are designed for contact to be made by means of a contact shoe. This has the advantage, in particular when making contact between lines with a relatively large cross section, of it being possible for said lines to be fastened in a reliable manner on the third contact point 61, with a contact shoe. The rail-shaped design of the power supply lines 13, 23, 24, 60 also ensures a cross section which is required at high currents.

Figure 8:
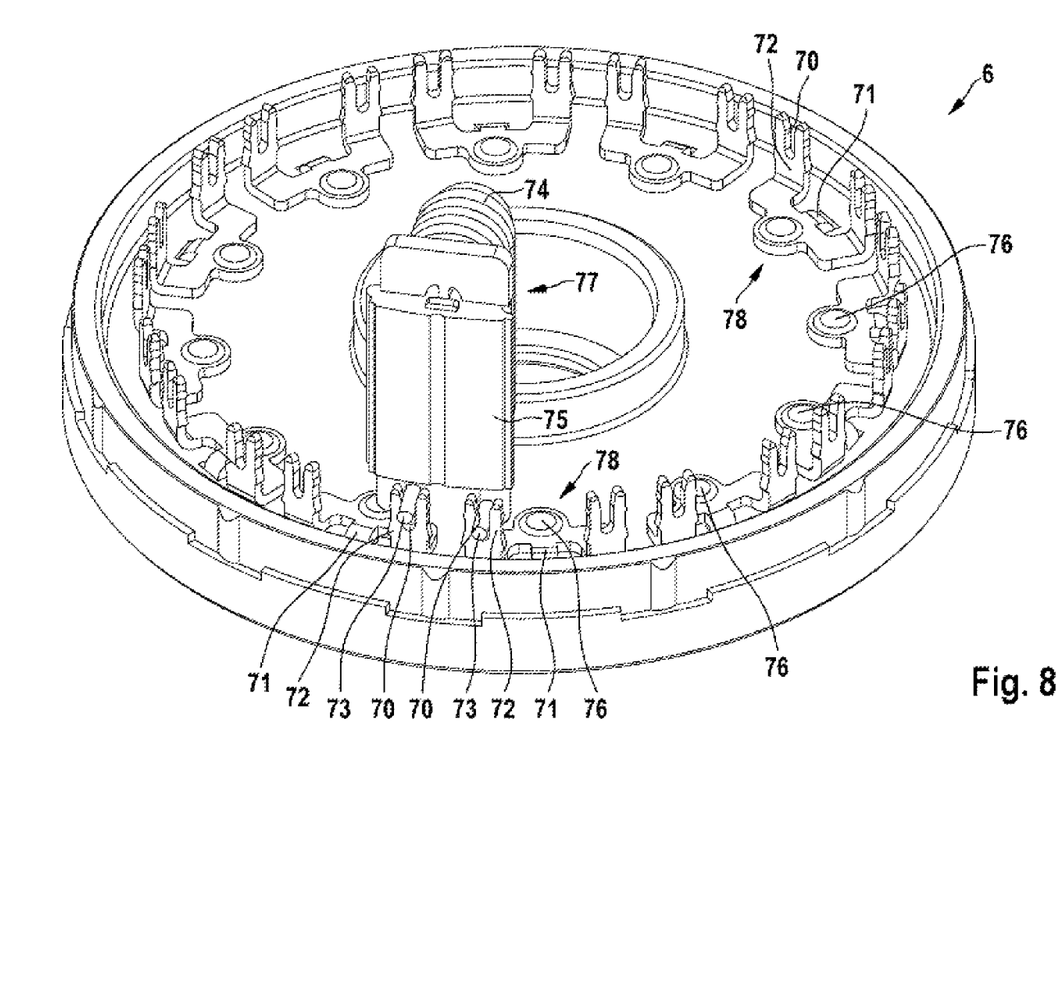
FIG. 8 shows a perspective view of a fifth endshield.

FIG. 8 shows a perspective view of a fifth endshield 6. In addition to the fifth endshield 6, a coil former 77 with a pole shoe 75 and a winding 74 is illustrated. The fifth endshield 6 has power supply lines 13, 24, 23, 60, 78 both on the side directed towards the inner side of the electric motor and on the outer side of the endshield, the power supply lines 13, 24, 23, 60, 78 being fastened to the fifth endshield 6 by means of a second holding element 76. Two pin-shaped contact elements 73 are arranged on the pole shoe 75. In each case one contact element 73 is connected to one end of the winding 74. The second power supply lines 78 arranged on the inside have third contact points 72, which protrude inwards into the housing of the electric motor and each have a contact receptacle 70. The contact element 73 of the coil former 77 engages in the contact receptacle 70. The second power supply lines 78 are connected to the power supply lines 13, 23, 24 located on the outer side via a power supply line element 71. This has the advantage that the windings are automatically connected to one another by the pole shoes when the fifth endshield 6 is inserted into the electric motor by virtue of the contact points 72 engaging in the pin-shaped contact elements 73. In this way, it is possible to avoid passing lines of the windings through the fifth endshield 6, as shown in FIG. 1 to FIG. 7, and then connecting the wires to the contact faces. In this way, the fifth endshield 6 can be built into the electric motor in a simple and quick manner, possibly also using automatic manufacturing systems.

Figure 9:
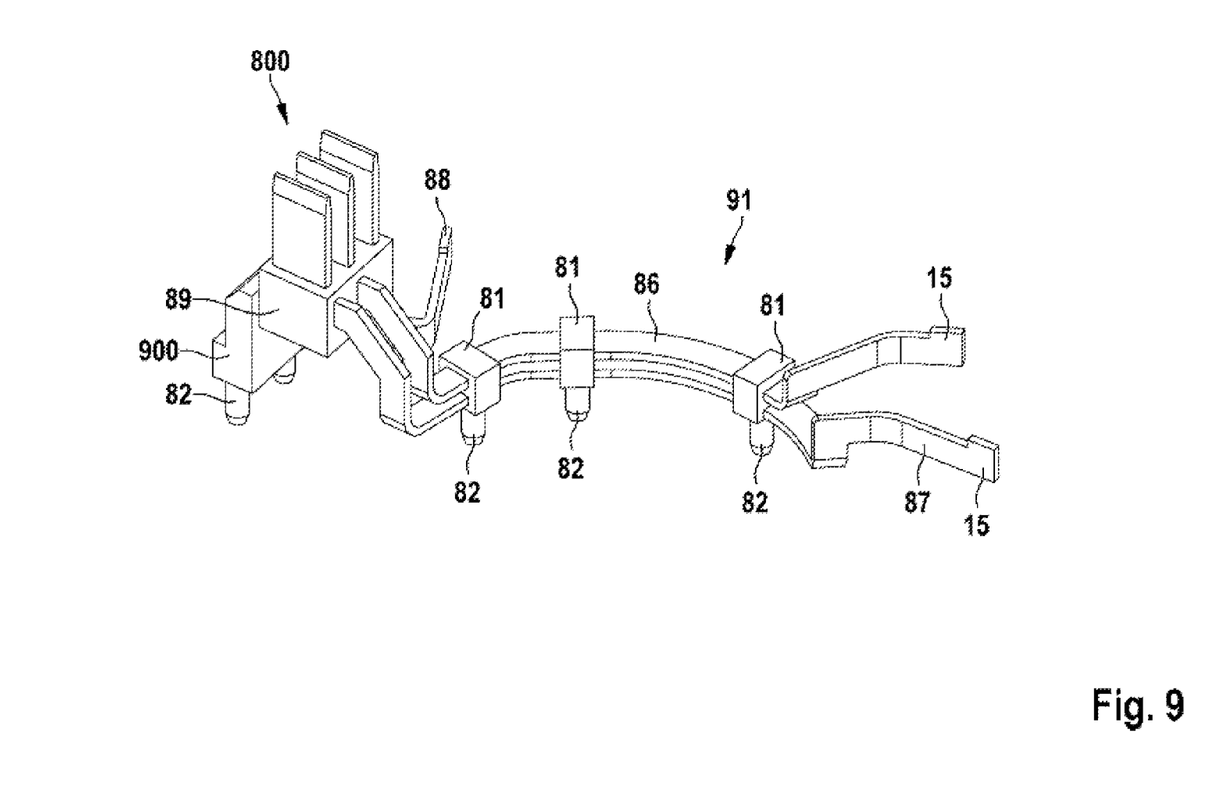
FIG. 9 shows a perspective view of a power supply line section.

FIG. 9 shows a perspective view of a power supply line section 91. The power supply line section has three power supply lines 86, 87, 88, which merge into a common connection 800. The individual power supply lines 86, 87, 88 are spaced apart by power supply line holding elements 81 and fastened on a sixth endshield 5 shown in FIG. 11 by means of the fastening elements 82 on the sixth endshield 5. The connection 800 has a supporting element 900 laterally in order to fasten the connection 800 by means of fastening elements 82 in the sixth endshield 5 and to support the forces for pushing a jack onto the connection 800 in a reliable manner.

Figure 10:
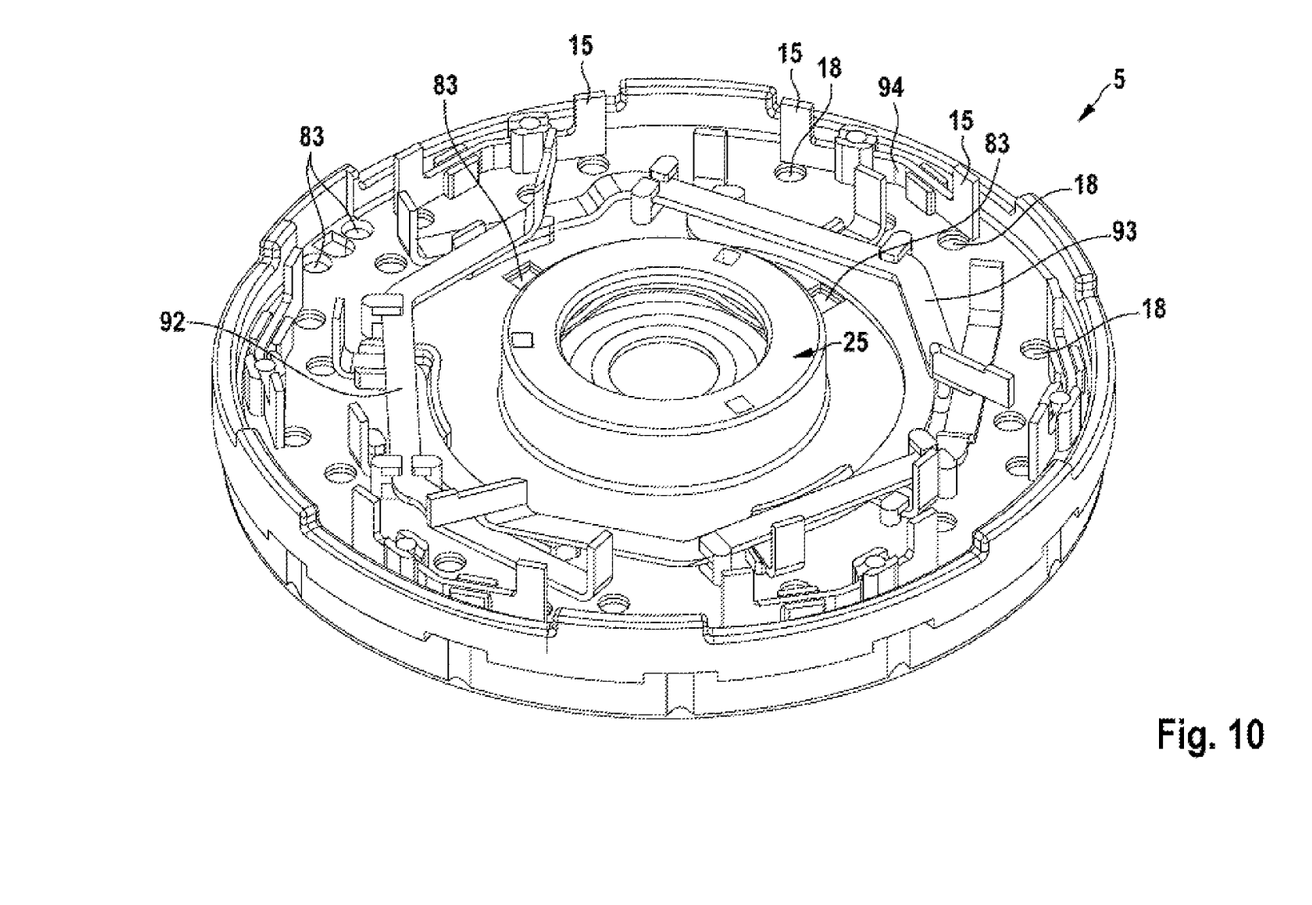
FIG. 10 and FIG. 11 show a perspective view of a sixth endshield.
Figure 11:
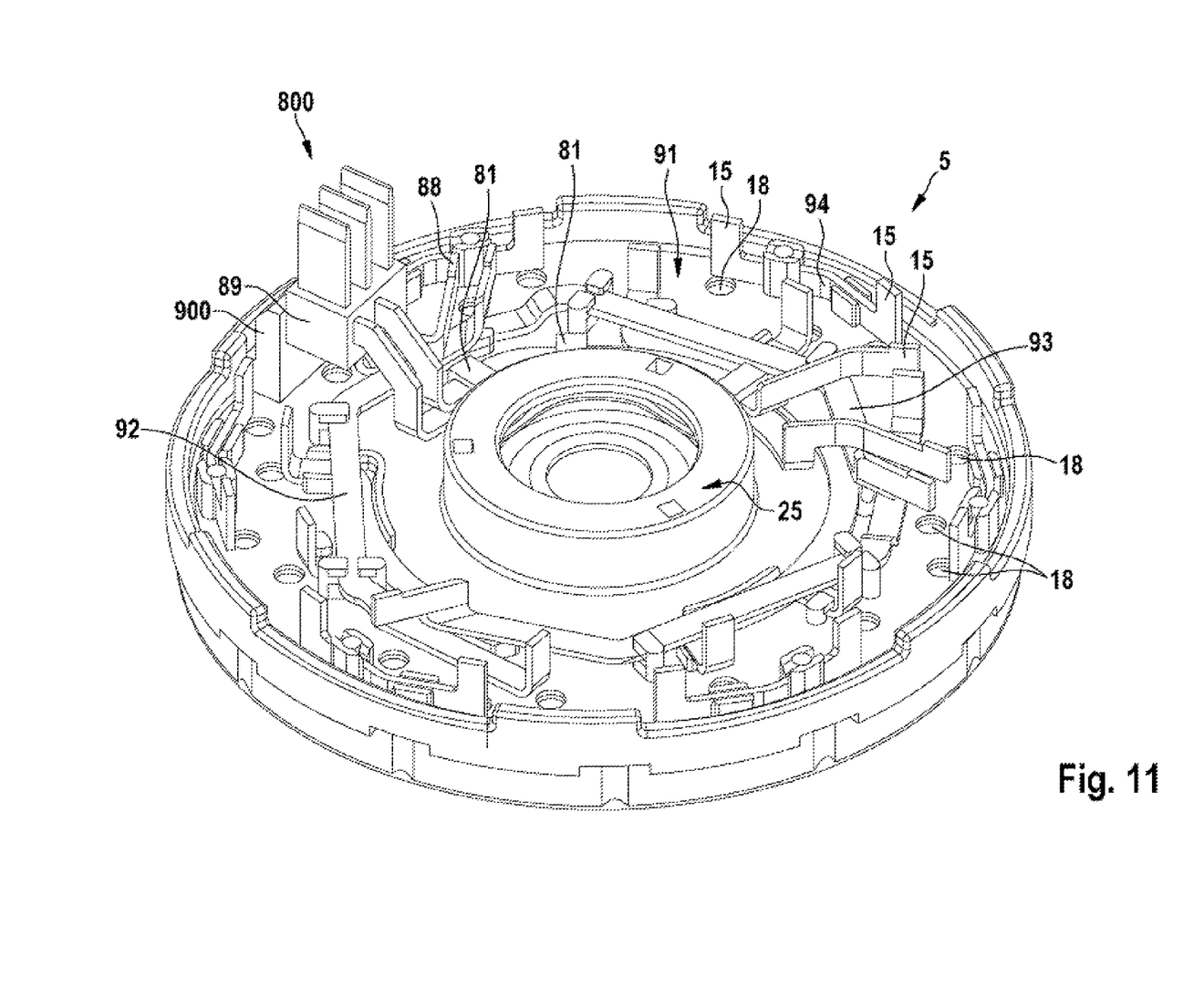

FIG. 10 and FIG. 11 show a perspective view of the sixth endshield 5. The sixth endshield 5 serves to receive the power supply line section 91 shown in FIG. 10. The fastening elements 82 of the power supply line section 91 engage in fastening openings 83 for this purpose. Contact is made between the power supply lines 92, 93, 94 by virtue of the lines of the windings being passed through the through-openings 18 and fastened on the contact faces 15. In this way, the windings can be interconnected corresponding to the interconnection scheme.

It is of course familiar to a person skilled in the art that the embodiments shown of the endshields are exemplary. However, it is essential here that the endshield has, in addition to the conventional receptacle for a bearing arrangement, power supply lines which are connected to the windings and to the electrical connection. In this way, it is possible to dispense with separate interconnection of the windings via an interconnection plate. This results in a shorter fitting time for the electric motor and in a design of the electric motor which is optimized in terms of installation space.

What is claimed is:

1. An endshield (5; 6; 7; 8; 9; 10) for an electric motor with a rotor, a rotor shaft axis, and a stator, the endshield (5; 6; 7; 8; 9; 10) having a receptacle (25) for a bearing (400) for bearing a shaft (100) of the rotor, and the endshield (5; 6; 7; 8; 9; 10) being arranged in a housing (35) of the electric motor, characterized in that the endshield (5; 6; 7; 8; 9; 10) has a power supply line (13, 23, 24, 60; 86, 87, 88; 92, 93, 94), which is designed to connect at least one winding (74) of the stator to at least one of an electrical connection and a further winding (74) of the stator, wherein the power supply line (13, 23, 24, 60; 86, 87, 88; 92, 93, 94) has a first contact face (12) and a second contact face (15), the first and second contact faces (12, 15) being aligned parallel to the rotor shaft axis, the first contact face (12) being connected to the electrical connection and the second contact face (15) being connected to the at least one winding (74), wherein the first and second contact faces (12, 15) are spaced from each other in a plane that is perpendicular to the motor shaft axis, wherein at least one of the first and second contact faces (12, 15) is in the form of an insulation displacement contact, and wherein the endshield (5; 6; 7; 8; 9; 10) has at least one opening (18) in order to guide a connection of the at least one winding (74) through the endshield (5; 6; 7; 8; 9; 10).

2. The endshield (5; 6; 7; 8; 9; 10) as claimed in claim 1, characterized in that the endshield (5; 6; 7; 8; 9; 10) is in the form of a plate, and the first contact face (12) is arranged on one side of the endshield (5; 6; 7; 8; 9; 10) and the second contact face (15) is arranged on an other side of the endshield (5; 6; 7; 8; 9; 10).

3. The endshield (5; 6; 7; 8; 9; 10) as claimed in claim 1, characterized in that at least one of a connection to the electrical connection at the first contact face (12) and the connection of the at least one winding (74) at the second contact face (15) is performed by means of one of a welding process, a soldering process and a crimping process.

4. The endshield (5; 6; 7; 8; 9; 10) as claimed in claim 1, characterized in that the power supply line (13, 23, 24, 60; 86, 87, 88; 92, 93, 94) is in the form of a rail.

5. The endshield (5; 6; 7; 8; 9; 10) as claimed in claim 4, characterized in that the power supply line (13, 23, 24, 60; 86, 87, 88; 92, 93, 94) is fastened to the endshield (5; 6; 7; 8; 9; 10) by means of at least one holding element (17, 19, 20).

6. The endshield of claim 4, wherein the rail is arranged perpendicular to the rotor shaft axis and substantially encircles the receptacle (25) relative to the motor shaft axis.

7. The endshield (5; 6; 7; 8; 9; 10) as claimed in claim 1, characterized in that the endshield (5; 6; 7; 8; 9; 10) has at least one latching element (28, 91) at the receptacle (25) of the bearing (400), said latching element being designed to fasten at least one of the bearing (400) and a spring washer (44) to the endshield (5; 6; 7; 8; 9; 10).

8. The endshield (5; 6; 7; 8; 9; 10) as claimed in claim 1, characterized in that the endshield (5; 6; 7; 8; 9; 10) has, circumferentially, at least one cutout (33, 37), which is designed to fix the endshield (5; 6; 7; 8; 9; 10) in the housing (35) of the electric motor.

9. The endshield (5; 6; 7; 8; 9; 10) as claimed in claim 1, characterized in that the power supply line (13, 23, 24, 60; 86, 87, 88; 92, 93, 94) is fastened to the endshield (5; 6; 7; 8; 9; 10) by means of at least one holding element (17, 19, 20).

10. The endshield (5; 6; 7; 8; 9; 10) as claimed in claim 9, characterized in that the holding element (17, 19, 20) has at least one latching tab (42), which is designed to fasten the power supply line (13, 23, 24, 60; 86, 87, 88; 92, 93, 94) to the holding element (17, 19, 20).

11. The endshield (5; 6; 7; 8; 9; 10) as claimed in claim 1, characterized in that the endshield (5; 6; 7; 8; 9; 10) is in the form of a plate, and the first contact face (12) is arranged on one side of the endshield (5; 6; 7; 8; 9; 10) and the second contact face (15) is arranged on an other side of the endshield (5; 6; 7; 8; 9; 10).

12. The endshield (5; 6; 7; 8; 9; 10) as claimed in claim 11, characterized in that at least one of a connection to the electrical connection at the first contact face (12) and the connection of the at least one winding winding (74) at the second contact face (15) is performed by means of one of a welding process, a soldering process and a crimping process.

13. The endshield (5; 6; 7; 8; 9; 10) as claimed in claim 12, characterized in that the power supply line (13, 23, 24, 60; 86, 87, 88; 92, 93, 94) is in the form of a rail.

14. The endshield (5; 6; 7; 8; 9; 10) as claimed in claim 13, characterized in that the endshield (5; 6; 7; 8; 9; 10) has at least one latching element (28, 91) at the receptacle (25) of the bearing (400), said latching element being designed to fasten at least one of the bearing (400) and a spring washer (44) to the endshield (5; 6; 7; 8; 9; 10).

15. The endshield (5; 6; 7; 8; 9; 10) as claimed in claim 14, characterized in that the endshield (5; 6; 7; 8; 9; 10) has, circumferentially, at least one cutout (33, 37), which is designed to fix the endshield (5; 6; 7; 8; 9; 10) in the housing (35) of the electric motor.

16. The endshield (5; 6; 7; 8; 9; 10) as claimed in claim 13, characterized in that the power supply line (13, 23, 24, 60; 86, 87, 88; 92, 93, 94) is fastened to the endshield (5; 6; 7; 8; 9; 10) by means of at least one holding element (17, 19, 20).

17. The endshield (5; 6; 7; 8; 9; 10) as claimed in claim 16, characterized in that the holding element (17, 19, 20) has at least one latching tab (42), which is designed to fasten the power supply line (13, 23, 24, 60; 86, 87, 88; 92, 93, 94) to the holding element (17, 19, 20).

* * * * *